(12) United States Patent
Kitagawa et al.

(10) Patent No.: US 11,220,222 B2
(45) Date of Patent: Jan. 11, 2022

(54) VEHICLE BODY REAR STRUCTURE

(71) Applicant: HONDA MOTOR CO., LTD., Tokyo (JP)

(72) Inventors: Akihiro Kitagawa, Wako (JP); Takashi Chirifu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 67 days.

(21) Appl. No.: 16/938,337

(22) Filed: Jul. 24, 2020

(65) Prior Publication Data

US 2021/0031700 A1 Feb. 4, 2021

(30) Foreign Application Priority Data

Jul. 31, 2019 (JP) .............................. JP2019-141145

(51) Int. Cl.
| | |
|---|---|
| *B60R 19/48* | (2006.01) |
| *G01S 13/931* | (2020.01) |
| *B60R 11/00* | (2006.01) |
| *B62D 25/08* | (2006.01) |
| *B60R 19/18* | (2006.01) |

(52) U.S. Cl.
CPC .............. *B60R 11/00* (2013.01); *B60R 19/18* (2013.01); *B60R 19/483* (2013.01); *B62D 25/08* (2013.01); *B60R 2011/004* (2013.01); *B60R 2011/008* (2013.01); *B60R 2019/1886* (2013.01); *G01S 13/931* (2013.01); *G01S 2013/9323* (2020.01); *G01S 2013/93272* (2020.01); *G01S 2013/93275* (2020.01)

(58) Field of Classification Search
CPC ....... B60R 11/00; B60R 19/18; B60R 19/483; B60R 2011/004; B60R 2011/008; B60R 2019/1886; G01S 2013/9317; G01S 2013/93272; G01S 2013/93275; B62D 25/08; B62D 25/087
See application file for complete search history.

(56) References Cited

U.S. PATENT DOCUMENTS

| | | | |
|---|---|---|---|
| 2016/0137230 A1 | 5/2016 | Taneda | |
| 2017/0008517 A1* | 1/2017 | Himi | ..................... G01S 13/862 |
| 2017/0297521 A1 | 10/2017 | Sugie et al. | |
| 2020/0101916 A1* | 4/2020 | Furumoto | ............. B60R 19/483 |
| 2021/0215517 A1* | 7/2021 | Bensalem | .............. G09G 5/022 |

FOREIGN PATENT DOCUMENTS

| | | | | |
|---|---|---|---|---|
| EP | 2008876 | * 12/2008 | .......... | B60R 19/483 |
| JP | 2016094151 A | 5/2016 | | |
| JP | 6344424 B2 | 6/2018 | | |
| WO | WO 2017/191201 | * 11/2017 | .......... | G01S 13/931 |

* cited by examiner

*Primary Examiner* — Gregory A Blankenship
(74) *Attorney, Agent, or Firm* — Armstrong Teasdale LLP

(57) ABSTRACT

A vehicle body rear structure includes: a rear panel provided in a rear part of a vehicle body; a bumper beam attached to a structural member provided in the rear part of the vehicle body; a sensor holding member attached to the rear panel; and a sensor attached to the sensor holding member and configured to detect surrounding information on a rear side of a vehicle, wherein an entirety of the sensor is positioned more forward than a rear end of the bumper beam, lower than a lower end of the bumper beam, and higher than a departure angle face.

9 Claims, 4 Drawing Sheets

VEHICLE BODY REAR STRUCTURE

TECHNICAL FIELD

The present invention relates to a vehicle body rear structure, and more particularly, to a rear structure of a vehicle body to which a sensor that detects surrounding information on a rear side of a vehicle is attached.

BACKGROUND ART

A vehicle (for example, an automobile) known in the art is provided with a sensor (for example, a radar or a lidar) attached to a vehicle body to detect surrounding information of the vehicle for executing automatic driving or driving assistance.

Such a sensor is attached to the vehicle body so as to face a prescribed direction. For example, such a sensor is directly attached to a high rigidity member such as a bumper beam or a skeleton member with a closed section structure, or is attached to the high rigidity member via a bracket formed by pressing or the like (for example, JP2016-94151A and JP6344424B2).

A sensor that detects surrounding information on a rear side of a vehicle is attached to a rear part of a vehicle body so as to face rearward. Preferably, such a sensor is attached to a high rigidity member such as a bumper beam or a skeleton member with a closed section structure so that the detecting direction of the sensor does not change. In this structure, the vibrations transmitted through the vehicle body do not act on the sensor, and thus a load caused by a rear collision or a load caused by contact between the rear part of the vehicle body and the ground does not act on the sensor. Accordingly, the attachment position and attachment angle of the sensor with respect to the vehicle body do not change due to the above load.

However, in the above structure, the sensor can be attached only to a high rigidity member such as a bumper beam or a skeleton member with a closed section structure. Furthermore, if the high rigidity member deforms at a time of a collision, the sensor attached to the high rigidity member may move and thus the detecting direction of the sensor may change.

SUMMARY OF THE INVENTION

In view of such a problem of the prior art, a primary object of the present invention is to provide a vehicle body rear structure that can prevent a load caused by a rear collision or a load caused by contact with the ground from acting on the sensor that detects surrounding information on a rear side of a vehicle and suppress changes in the attachment position and attachment angle of the sensor with respect to the vehicle body without limiting the attachment member of the sensor to a high rigidity member.

To achieve such an object, one embodiment of the present invention provides a vehicle body rear structure (4), including: a rear panel (28) provided in a rear part of a vehicle body (2); a bumper beam (20) attached to a structural member (18) provided in the rear part of the vehicle body; a sensor holding member (40) attached to the rear panel; and a sensor (52) attached to the sensor holding member and configured to detect surrounding information on a rear side of a vehicle, wherein an entirety of the sensor is positioned more forward than a rear end of the bumper beam, lower than a lower end of the bumper beam, and higher than a departure angle face (D).

According to this arrangement, the sensor is attached to the rear panel via the sensor holding member. Thus, even if the high rigidity member such as a skeleton member deforms due to a load caused by a rear collision or a load caused by contact with the ground, the sensor that detects the surrounding information on the rear side of the vehicle does not deform (move) together with the high rigidity member. Thus, a change in the attachment position and attachment angle of the sensor with respect to the vehicle body can be suppressed.

Preferably, in the above vehicle body rear structure, the sensor holding member includes: a first bracket (42) joined to the rear panel; and a second bracket (44) joined to the first bracket and the rear panel and holding the sensor.

According to this arrangement, even if the first and second brackets are formed by pressing, the shape, thickness and material of the first and second brackets can be individually set with high flexibility in design. Accordingly, the strength and rigidity for supporting the sensor can be obtained by a lightweight and inexpensive sensor holding member.

Preferably, in the above vehicle body rear structure, the rear panel includes: an upper vertical part (28A) extending substantially vertically; an inclined part (28B) extending downward from a lower edge of the upper vertical part and inclined with respect to a fore and aft direction; and a lower vertical part (28C) extending downward and substantially vertically from a lower edge of the inclined part, the first bracket is made of a plate and includes: a main part (42A); an upper joined part (42B) extending higher than an upper edge of the main part and joined to the inclined part; and a lower joined part (42C) extending lower than a lower edge of the main part and joined to the lower vertical part, and the second bracket is made of a plate and includes: a sensor attachment part (44A) to which the sensor is attached; an upper connected part (44B) extending higher than an upper edge of the sensor attachment part and joined to the main part of the first bracket; and a side connected part (44C) extending more forward than a side edge of the sensor attachment part and joined to the lower vertical part.

According to this arrangement, the inclined part inclined with respect to the fore and aft direction is provided between the upper vertical part and the lower vertical part of the rear panel. Accordingly, even if the rear panel is made of a thin plate, the first bracket can be joined to the inclined part with high attachment rigidity. Furthermore, the supporting load of the sensor can be dispersed by providing the first bracket with a plurality of joined parts joined to the rear panel and providing the second bracket with a plurality of connected parts connected to the rear panel and the first bracket. Accordingly, the strength and rigidity of the attachment part of the sensor can be increased.

Preferably, in the above vehicle body rear structure, the rear panel is configured such that on an outside of the upper joined part and the lower joined part, a boundary line (A) between the upper vertical part and the inclined part and a boundary line (B) between the lower vertical part and the inclined part converge on an opening section part (31) provided on an upper side of the boundary lines, as the boundary lines approach a bumper beam fastening part (29) provided on an outside of the boundary lines.

According to this arrangement, in the rear view of the vehicle, the boundary line between the upper vertical part and the inclined part and the boundary line between the lower vertical part and the inclined part converge on the opening section part in an arc shape. Accordingly, the rear panel can be prevented from bending in the vertical direction and the fore and aft direction around the boundary lines due to the vibrations input to the sensor holding member.

Preferably, the above vehicle body rear structure further includes a bumper face (24) attached to the bumper beam, wherein the bumper face is provided with an opening (58) at a position corresponding to the sensor in a fore and aft direction, and a sealing member (60) is provided between an outer circumferential surface of the sensor and an inner circumferential edge of the opening.

According to this arrangement, even if the sensor faces rearward via the opening of the bumper face, the exposure of the sensor to the outside of the vehicle can be minimized by using the sealing member, so that the sensor can be protected from water, flying stones, and dust.

Preferably, in the above vehicle body rear structure, an adjustment screw (54, 56) for adjusting an attachment angle of the sensor is accessible from the rear side of the vehicle via the opening.

According to this arrangement, by simply removing the sealing member, the attachment angle of the sensor can be adjusted without removing the bumper face, so that work efficiency can be improved.

Preferably, the above vehicle body rear structure further includes an under cover (34) extending in a bottom of the vehicle body from a more forward position to a more rearward position than the sensor holding member and reaching a lower end of the bumper face, wherein a rear edge (34A) of the under cover defines a lower edge of the opening.

According to this arrangement, the air flowing from the front to the rear in the bottom of the vehicle body is rectified by the under cover, and thus the velocity of the airflow becomes faster in the vicinity of the detection surface of the sensor. Accordingly, water and dust are likely to be quickly blown to the rear of the vehicle without staying around the detection surface, and thus are unlikely to adhere to the detection surface.

Preferably, the above vehicle body rear structure further includes a high strength member (30) attached to the bottom of the vehicle body on the front side of the sensor holding member, wherein the under cover includes a part covering a lower side of the high strength member.

According to this arrangement, the high strength member is not exposed to the lower part of the vehicle and thus does not obstruct the airflow, so that aerodynamic characteristics of the vehicle can be improved.

Preferably, in the above vehicle body rear structure, the departure angle face connects a lowermost part (X) in a rear overhang (Y) of the vehicle and a grounding surface (10A) of a rear wheel (10).

Thus, in the above vehicle body rear structure according to an embodiment of the present invention, the sensor is attached to the rear panel via the sensor holding member. Thus, even if the high rigidity member such as a skeleton member deforms due to a load caused by a rear collision or a load caused by contact with the ground, the sensor that detects the surrounding information on the rear side of the vehicle does not deform (move) together with the high rigidity member. Thus, a change in the attachment position and attachment angle of the sensor with respect to the vehicle body can be suppressed.

DESCRIPTION OF THE PREFERRED EMBODIMENT(S)

In the following, an embodiment of a vehicle body rear structure 4 according to the present invention will be described with reference to FIGS. 1 to 4.

Figure 1:
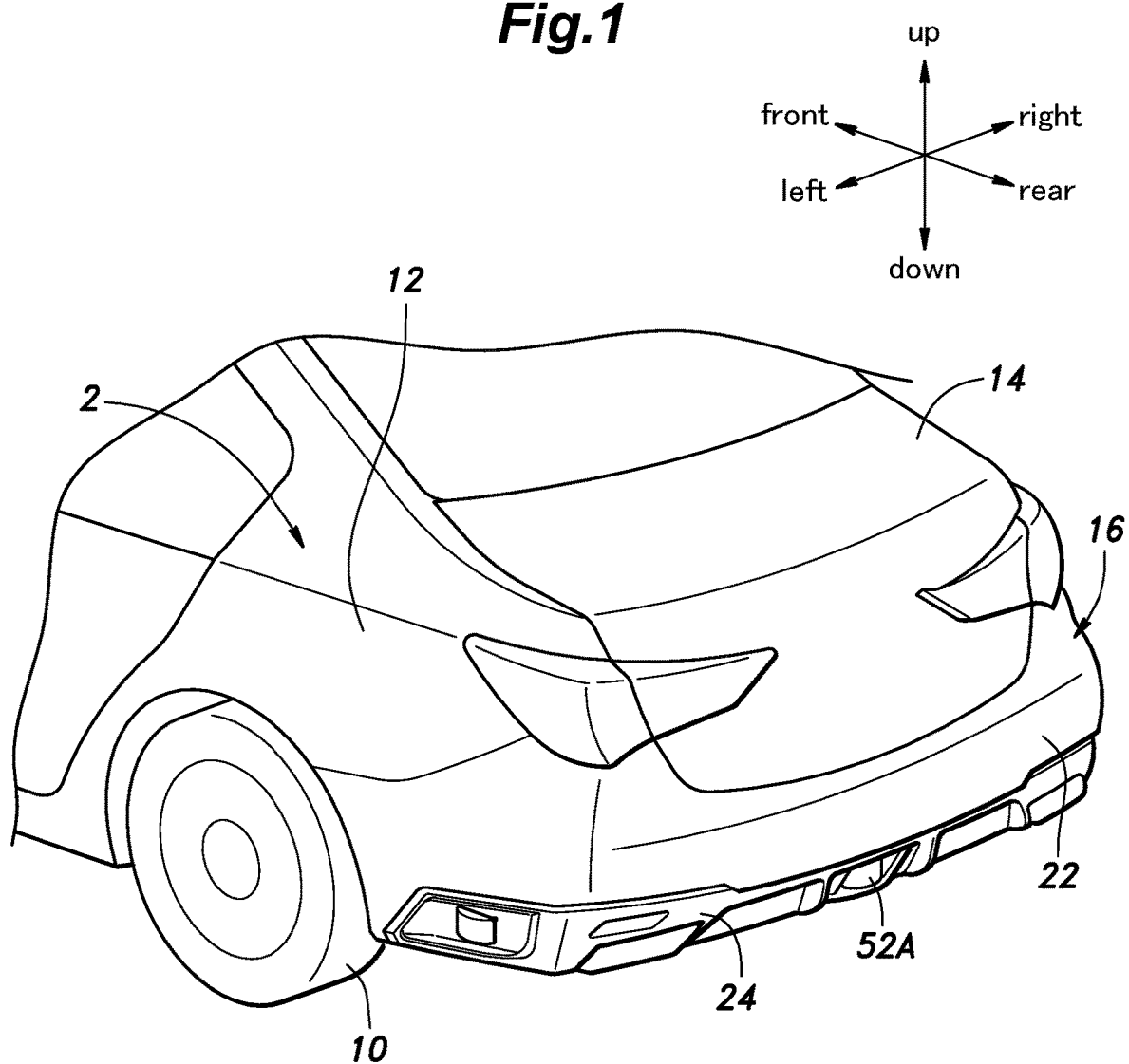
FIG. 1 is a rear perspective view showing a vehicle provided with a vehicle body rear structure according to an embodiment of the present invention.

As shown in FIG. 1, the vehicle body rear structure 4 includes left and right rear side outer panels 12 (only the left one is shown in FIG. 1) that compose wheelhouses of rear wheels 10, a rear trunk lid 14, and a rear bumper 16. The rear bumper 16 includes a bumper beam 20 (see FIG. 4) with a substantially rectangular cross section, an upper bumper face 22, and a lower bumper face 24. The bumper beam 20 extends in the lateral direction, and is attached to rear ends of left and right rear side frames (not shown) via bumper brackets 18 (see FIG. 4) that compose a part of a structural member provided in a rear part of a vehicle body 2. The upper bumper face 22 and the lower bumper face 24 are attached to the bumper beam 20.

Figure 2:
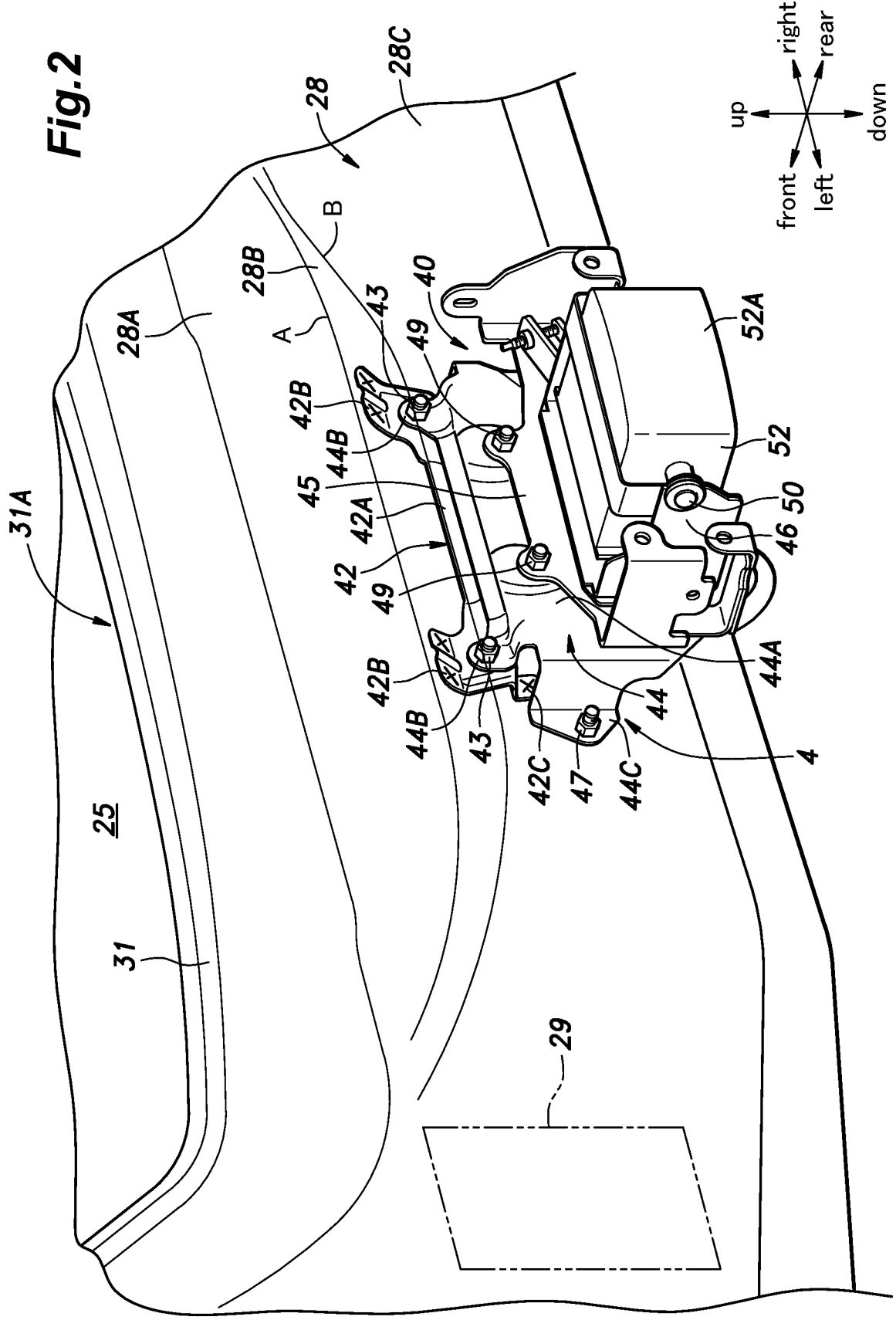
FIG. 2 is a perspective view showing a major part of the vehicle body rear structure according to the embodiment.
Figure 3:
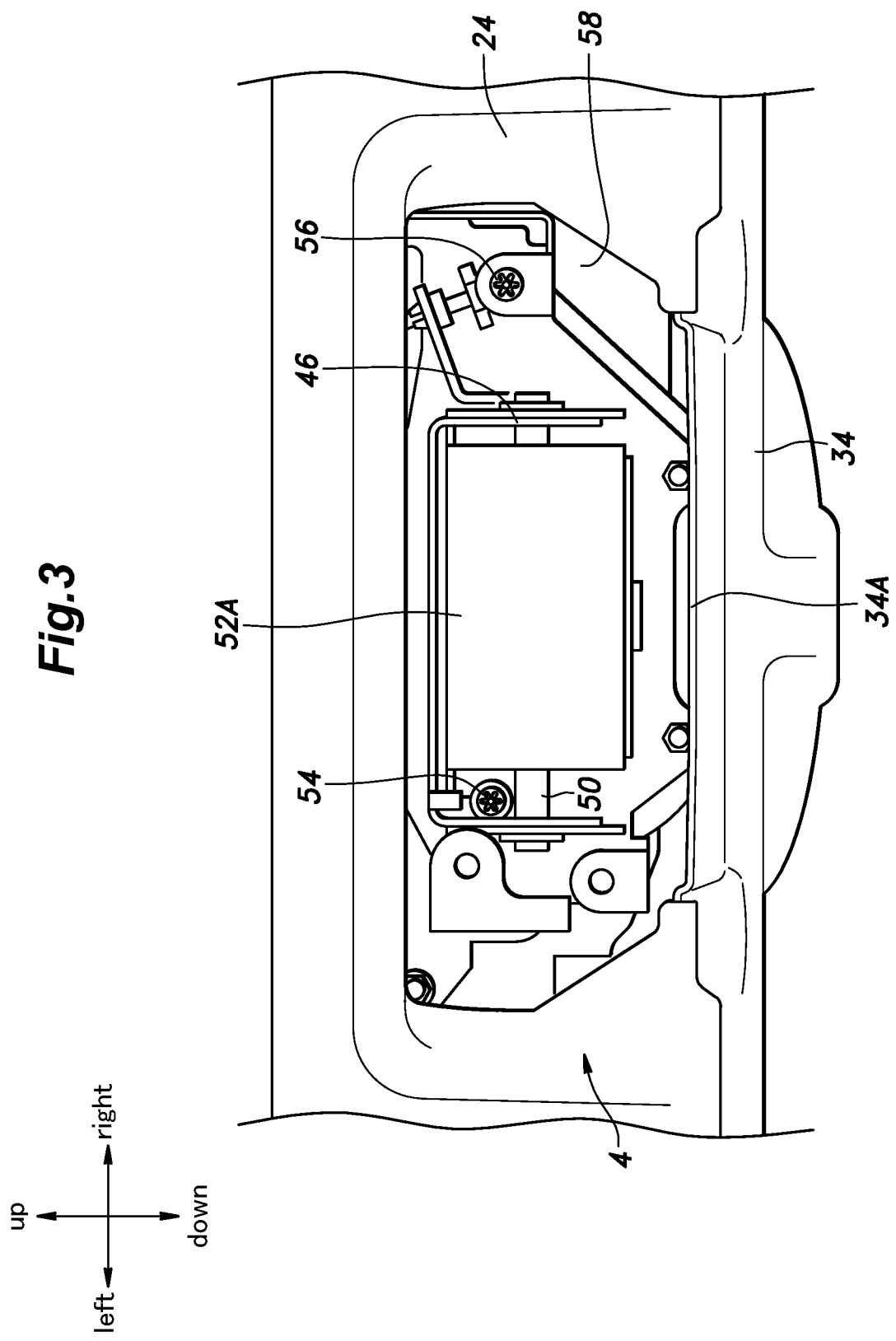
FIG. 3 is a rear view showing the major part of the vehicle body rear structure according to the embodiment.
Figure 4:
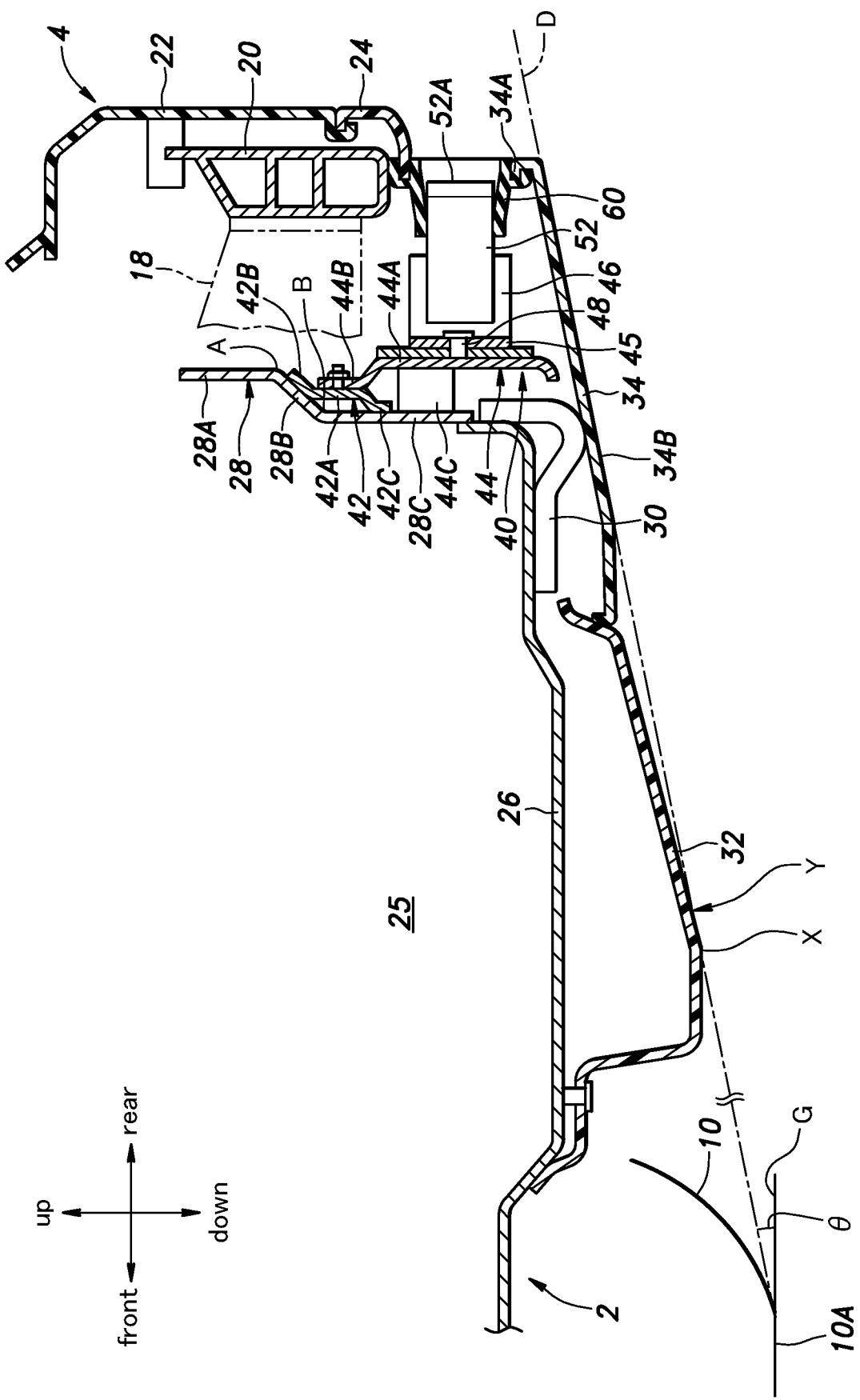
FIG. 4 is a vertical sectional view from a lateral side of the major part of the vehicle body rear structure according to the embodiment.

As shown in FIGS. 2 to 4, the vehicle body rear structure 4 further includes a rear floor panel 26, a rear panel 28, a high strength member 30, a main under cover 32, and a sub under cover 34. The rear floor panel 26 forms a bottom of a trunk 25. The rear panel 28 is joined to a rear end of the rear floor panel 26 and provided in a rear part of the vehicle body 2. The high strength member 30 is joined to a laterally center part of the rear floor panel 26. The main under cover 32 and the sub under cover 34 cover a lower side of the rear floor panel 26 and thus serve as aerodynamic devices to reduce airflow resistance.

The sub under cover 34 is formed continuously with a rear part of the main under cover 32, and extends substantially along a departure angle face D. More specifically, the sub under cover 34 extends in a bottom of the vehicle body 2 from a more forward position to a more rearward position than an undermentioned sensor holding member 40, and reaches a lower side of the bumper beam 20 and the lower bumper face 24 (namely, reaches a lower end of the bumper face 24 in the fore and aft direction). The sub under cover 34 includes a part 34B that covers a lower side of the high strength member 30.

The high strength member 30 serves as a jack-up member for jacking up a laterally center part of a rear part of the vehicle and also protects an undermentioned sensor 52 from contact with the ground G. The structure of the high strength member 30 can be selected from various structures such as a steel plate formed by a pressing and a bent pipe, as long as such a structure can stand a lifting load of the vehicle when the vehicle is jacked up. If the high strength member 30 is exposed to the outside, the aerodynamic characteristics of the rear part of the vehicle body 2 may be deteriorated. In contrast, in the present embodiment, the high strength member 30 is covered with the sub under cover 34, so that the aerodynamic characteristics of the rear part of the vehicle body 2 can be improved. Incidentally, in other embodiments, the high strength member 30 may serve as a subframe structure for suspending rear wheels 10 of the vehicle or a guard pipe for protecting a fuel flow path (for example, a fuel tank or a fuel pipe) from contact with the ground G.

The rear panel 28 includes an upper vertical part 28A extending substantially vertically with respect to the fore and aft direction, an inclined part 28B extending downward from a lower edge of the upper vertical part 28A and inclined with respect to the fore and aft direction and the vertical direction, and a lower vertical part 28C extending downward and substantially vertically with respect to the fore and aft direction from a lower edge of the inclined part 28B.

A boundary line A between the upper vertical part 28A and the inclined part 28B of the rear panel 28 and a boundary line B between the lower vertical part 28C and the inclined part 28B of the rear panel 28 converge on (or approach) an opening section part 31 provided on an upper side of the boundary lines A, B, as the boundary lines A, B approach left and right bumper beam fastening parts 29 (only the left one is shown in FIG. 2) provided on an outside in the lateral direction of the boundary lines A, B. The opening section part 31 defines an opening 31A which is opened/closed by a closing member such as the rear trunk lid 14 or a tailgate (not shown). At the bumper beam fastening parts 29, the bumper beam 20 is fastened to the bumper brackets 18. Lower ends of the boundary lines A, B are positioned substantially at a laterally center of the inclined part 28B.

In the rear view of the vehicle, the boundary line A (a bending line of a rear panel 28) between the upper vertical part 28A and the inclined part 28B and the boundary line B (a bending line of the rear panel 28) between the lower vertical part 28C and the inclined part 28B converge on (reach) the opening section part 31 in an arc shape on outsides in the lateral direction of upper joined parts 42B and lower joined parts 42C of an undermentioned first bracket 42. Accordingly, the rear panel 28 can be prevented from bending in the vertical direction and the fore and aft direction around the boundary lines A, B due to the vibrations input to the sensor holding member 40. Further, the boundary lines A and B converge on the opening section part 31 which is rigid and hard, so that the vibrations input to the sensor holding member 40 and the load caused by the vertical vibrations of the sensor 52 can be transmitted to the opening section part 31 via the inclined part 28B. Accordingly, the boundary lines A and B of the rear panel 28 become resistant to a bending force.

The sensor holding member 40 is attached to a laterally center part of a rear part of the rear panel 28. The sensor holding member 40 includes a first bracket 42 and a second bracket 44 which are formed by pressing plate materials (metal plates).

The first bracket 42 includes a substantially rectangular main part 42A, left and right upper joined parts 42B, and left and right lower joined parts 42C. The main part 42A extends substantially vertically. The upper joined parts 42B extend higher than an upper edge of the main part 42A, and are joined to the inclined part 28B of the rear panel 28 by welding or the like. The lower joined parts 42C extend lower than a lower edge of the main part 42A, and are joined to the lower vertical part 28C of the rear panel 28 by welding or the like.

The second bracket 44 includes a substantially rectangular sensor attachment part 44A, left and right upper connected parts 44B, and left and right side connected parts 44C. The sensor attachment part 44A extends substantially vertically so that the sensor 52 can be attached thereto. The upper connected parts 44B extend higher than an upper edge of the sensor attachment part 44A, and are joined to the main part 42A of the first bracket 42 by bolts and nuts 43. The side connected parts 44C extend more forward than left and right side edges of the sensor attachment part 44A, and are joined to the lower vertical part 28C of the rear panel 28 by bolts and nuts 47. Each side connected part 44C is provided in the vicinity of an upper edge of the sensor attachment part 44A, and a lower end side of the second bracket 44 is a free end side.

As described above, the sensor holding member 40 is composed of two parts of the first and second brackets 42, 44, so that the first and second brackets 42, 44 can be formed by pressing. Thus, the shape, thickness and material of the first and second brackets 42, 44 that serve as the mounting brackets of the sensor 52 can be individually set with high flexibility. Accordingly, the strength and rigidity for supporting the sensor 52 can be obtained by a lightweight and inexpensive sensor holding member 40.

An attachment base plate 45 is fixed to the sensor attachment part 44A of the second bracket 44 via a plurality of bolts and nuts 49. The attachment base plate 45 supports a sensor support member 46 via a support shaft 48 such that the sensor support member 46 is rotatable around a horizontal axis extending in the fore and aft direction. The sensor support member 46 supports the sensor 52 via a support shaft 50 such that the sensor 52 is rotatable around a horizontal axis extending in the lateral direction. The sensor 52 consists of a radar and/or a lidar, for example, and detects the surrounding information on the rear side of the vehicle. A rear surface of the sensor 52 serves as a water-resistant detection surface 52A (an emitting and receiving surface of a radio wave and/or a light beam).

As shown in FIG. 4, the sensor 52 is held by the sensor holding member 40 such that the entirety of the sensor 52 is positioned more forward than a rear end of the bumper beam 20, lower than a lower end of the bumper beam 20, and higher than the departure angle face D. The departure angle face D is a face (a tangent angle face) that connects a lowermost part X in a rear overhang Y (a more rearward part than each rear wheel 10) of the vehicle and a rear end of a grounding surface 10A (a surface in contact with the ground G) of each rear wheel 10. The departure angle face D may be parallel with the lateral direction. In a side view of the vehicle, a departure angle $\theta$ is defined between the departure angle face D and the ground G.

With such an arrangement, even if a load due to a rear collision (for example, a minor collision such as a light collision) is input to the bumper beam 20, such a load is not transmitted to the sensor 52. In addition, the lowermost part X in the rear overhang Y of the vehicle first comes into contact with the ground G, so that the sensor 52 can be prevented from coming into contact with the ground G and being damaged. Accordingly, a change in the attachment position and attachment angle of the sensor 52 with respect to the vehicle body 2 can be suppressed, so that the sensor 52 can detect the surrounding information on the rear side of the vehicle according to an initial setting for a long time.

An adjustment screw 54 for adjusting an attachment angle of the sensor 52 is provided between the second bracket 44 and the sensor support member 46. According to a rotation of the adjustment screw 54, the sensor support member 46 is rotated around the horizontal axis extending in the fore and aft direction with respect to the second bracket 44, and thus the attachment angle of the sensor 52 is adjusted. An adjustment screw 56 for adjusting an attachment angle of the sensor 52 is provided between the sensor support member 46 and the sensor 52. According to a rotation of the adjustment screw 56, the sensor 52 is rotated around the horizontal axis extending in the lateral direction with respect to the sensor support member 46, and thus the attachment angle of the sensor 52 is adjusted. The adjustment screws 54, 56 each have a central axis in the fore and aft direction and a screw head at a rear end. Accordingly, both the adjustment screws 54, 56 are accessible from the rear side of the vehicle, and the access direction of the tool that rotates the adjustment screws 54, 56 is the fore and aft direction.

The lower bumper face 24 is provided with a substantially rectangular opening 58 (window) at a position corresponding to the sensor 52 in the fore and aft direction and the lateral direction. An upper edge and left and right side edges of the opening 58 are defined by the lower bumper face 24. A lower edge of the opening 58 is defined by a rear edge 34A of the sub under cover 34. In other words, the sub under cover 34 includes the rear edge 34A that defines the lower edge of the opening 58.

A sealing member 60 is provided between an outer circumferential surface of the sensor 52 and an inner circumferential edge (an entire circumference) of the opening 58 defined by the lower bumper face 24 and the sub under cover 34. The sealing member 60 is fixed to an inner circumferential edge or its vicinity of at least one of the lower bumper face 24 and the sub under cover 34 and abuts against the outer circumferential surface of the sensor 52.

Accordingly, only the water-resistant detection surface 52A of the sensor 52 is exposed to the rear side, and thus the sensor 52 is protected from water, flying stones, and dust. The sealing member 60 may be attached to the sensor 52 via a rubber member or a sponge member which is elastically deformable, and may be fixed to the lower bumper face 24 and the sub under cover 34 via a bolt or a clip, or fitted to the lower bumper face 24 and the sub under cover 34. According to such a configuration, the attachment error of the lower bumper face 24 and the sub under cover 34 with respect to the vehicle body 2 does not affect the attachment accuracy of the sensor 52 with respect to the vehicle body 2.

The lower edge of the opening 58 is defined by the rear edge 34A of the sub under cover 34. Accordingly, compared with a case where the lower edge of the opening 58 is defined by the lower bumper face 24, the detection surface 52A of the sensor 52 can be positioned closer to a bottom of the sub under cover 34. Thereby, the sensor 52 can be inconspicuously positioned at a rear end of the vehicle and a lower part of the vehicle body 2.

Further, a bottom surface of the vehicle body 2 in the vicinity of a lower end of the rear bumper 16 is covered with the sub under cover 34 which serves as an aerodynamic device with small airflow resistance. Accordingly, the air flowing through the lower end of the rear bumper 16 from the front to the rear is rectified by the under cover 34, and thus the velocity of the airflow in the lower end of the rear bumper 16 becomes faster than the velocity of the airflow in an upper end thereof. Accordingly, water and dust are likely to be quickly blown to the rear of the vehicle without staying around the detection surface 52A of the sensor 52, and thus the detection surface 52A of the sensor 52 is less likely to be contaminated with the water and dust.

The opening 58 has a size to allow the screw heads of the adjustment screws 54, 56 to be exposed to the rear side. Thus, in a state where the sealing member 60 is removed, the screw heads of the adjustment screws 54, 56 are accessible from the rear side via the opening 58. Accordingly, by simply removing the sealing member 60, the attachment angle of the sensor 52 can be adjusted without removing the rear bumper 16, so that work efficiency can be improved.

Incidentally, the adjustment screws 54, 56 may have hexalobular screw heads, unlike the bolts and nuts 43, 47 for attaching the second bracket 44 to the first bracket 42 and the rear panel 28. According to such a configuration, it is possible to distinguish a screwdriver for the adjustment screws 54, 56 from a screwdriver for the bolts and nuts 43, 47. Thus, when the second bracket 44 is attached to the first bracket 42 and the rear panel 28 via the bolts and nuts 43, 47, the attachment angle of the sensor 52 can be prevented from being changed by an erroneous operation of the adjustment screws 54, 56.

Concrete embodiments of the present invention have been described in the foregoing, but the present invention should not be limited by the foregoing embodiments and various modifications and alterations are possible within the scope of the present invention. For example, the opening 58 may be defined by both the lower bumper face 24 and the sub under cover 34, or may be defined only by the lower bumper face 24 or the sub under cover 34. Further, not all the structural elements shown in the above embodiments are necessarily indispensable and they may be selectively adopted as appropriate within the scope of the present invention.

The invention claimed is:

1. A vehicle body rear structure, comprising:
    a rear panel provided in a rear part of a vehicle body;
    a bumper beam attached to a structural member provided in the rear part of the vehicle body;
    a sensor holding member attached to the rear panel; and
    a sensor attached to the sensor holding member and configured to detect surrounding information on a rear side of a vehicle,
    wherein an entirety of the sensor is positioned more forward than a rear end of the bumper beam, lower than a lower end of the bumper beam, and higher than a departure angle face.

2. The vehicle body rear structure according to claim 1, wherein the sensor holding member includes: a first bracket joined to the rear panel; and a second bracket joined to the first bracket and the rear panel and holding the sensor.

3. The vehicle body rear structure according to claim 2, wherein the rear panel includes: an upper vertical part extending substantially vertically; an inclined part extending downward from a lower edge of the upper vertical part and inclined with respect to a fore and aft direction; and a lower vertical part extending downward and substantially vertically from a lower edge of the inclined part,
    the first bracket is made of a plate and includes: a main part; an upper joined part extending higher than an upper edge of the main part and joined to the inclined part; and a lower joined part extending lower than a lower edge of the main part and joined to the lower vertical part, and
    the second bracket is made of a plate and includes: a sensor attachment part to which the sensor is attached; an upper connected part extending higher than an upper edge of the sensor attachment part and joined to the main part of the first bracket; and a side connected part extending more forward than a side edge of the sensor attachment part and joined to the lower vertical part.

4. The vehicle body rear structure according to claim 3, wherein the rear panel is configured such that on an outside of the upper joined part and the lower joined part, a boundary line between the upper vertical part and the inclined part and a boundary line between the lower vertical part and the inclined part converge on an opening section part provided on an upper side of the boundary lines, as the boundary lines approach a bumper beam fastening part provided on an outside of the boundary lines.

5. The vehicle body rear structure according to claim 1, further comprising a bumper face attached to the bumper beam,
   wherein the bumper face is provided with an opening at a position corresponding to the sensor in a fore and aft direction, and
   a sealing member is provided between an outer circumferential surface of the sensor and an inner circumferential edge of the opening.

6. The vehicle body rear structure according to claim 5, wherein an adjustment screw for adjusting an attachment angle of the sensor is accessible from the rear side of the vehicle via the opening.

7. The vehicle body rear structure according to claim 6, further comprising an under cover extending in a bottom of the vehicle body from a more forward position to a more rearward position than the sensor holding member and reaching a lower end of the bumper face,
   wherein a rear edge of the under cover defines a lower edge of the opening.

8. The vehicle body rear structure according to claim 7, further comprising a high strength member attached to the bottom of the vehicle body on the front side of the sensor holding member,
   wherein the under cover includes a part covering a lower side of the high strength member.

9. The vehicle body rear structure according to claim 1, wherein the departure angle face connects a lowermost part in a rear overhang of the vehicle and a grounding surface of a rear wheel.

* * * * *